United States Patent
Cederman-Haysom et al.

(10) Patent No.: US 10,191,992 B2
(45) Date of Patent: Jan. 29, 2019

(54) UNIFIED PROFILES

(71) Applicant: SURVEYMONKEY INC., Palo Alto, CA (US)

(72) Inventors: Timothy Gray Cederman-Haysom, San Carlos, CA (US); David Wong, Cupertino, CA (US)

(73) Assignee: SURVEYMONKEY INC., San Mateo, CA (US)

( * ) Notice: Subject to any disclaimer, the term of this patent is extended or adjusted under 35 U.S.C. 154(b) by 534 days.

(21) Appl. No.: 14/584,567

(22) Filed: Dec. 29, 2014

(65) Prior Publication Data

US 2016/0188740 A1 Jun. 30, 2016

(51) Int. Cl.
*G06F 17/30* (2006.01)

(52) U.S. Cl.
CPC .. *G06F 17/30876* (2013.01); *G06F 17/30289* (2013.01); *G06F 17/30067* (2013.01); *G06F 17/30286* (2013.01); *G06F 17/30557* (2013.01)

(58) Field of Classification Search
CPC ......... G06F 17/30289; G06F 17/30067; G06F 17/30286; G06F 17/30557; G06F 2221/21; G06F 1121/2141
USPC ........ 707/805, 705, 607, 783, 784; 709/203, 709/209
See application file for complete search history.

(56) References Cited

U.S. PATENT DOCUMENTS

| | | | |
|---|---|---|---|
| 5,761,606 A * | 6/1998 | Wolzien | H04H 20/28 348/460 |
| 6,182,052 B1 * | 1/2001 | Fulton | G06Q 10/02 705/26.8 |
| 6,233,736 B1 * | 5/2001 | Wolzien | H04H 20/28 348/E7.031 |
| 7,233,940 B2 * | 6/2007 | Bamberger | G06F 11/006 |
| 7,856,373 B2 * | 12/2010 | Ullah | G06Q 30/02 705/14.4 |
| 8,756,661 B2 * | 6/2014 | Levenberg | H04L 63/0807 726/4 |
| 8,775,270 B2 * | 7/2014 | Tan | G06F 21/10 705/26.44 |
| 8,775,731 B2 * | 7/2014 | McHale | G06F 3/0604 711/103 |
| 8,903,960 B2 * | 12/2014 | Naddeo | G06F 8/61 370/338 |
| 9,092,276 B2 * | 7/2015 | Allen | G06F 9/541 |
| 2006/0259632 A1 * | 11/2006 | Crawford | H04L 67/14 709/229 |

(Continued)

FOREIGN PATENT DOCUMENTS

WO WO-2011143761 A1 * 11/2011 ............. G06Q 10/10

*Primary Examiner* — Frantz Coby
(74) *Attorney, Agent, or Firm* — Miller Nash Graham & Dunn

(57) ABSTRACT

A system includes a first computer, the first computer including a user interface to allow a user to access an online service provided by an online service provider and to provide user information, a storage in which to store the user information, a processor executing instructions that cause the processor to receive the user information, access the storage to determine if the user information exists in the storage, determine if the user information in the storage matches the user information provided through the user interface, and if the user information does not match, notifying the user through the interface.

6 Claims, 3 Drawing Sheets

(56) References Cited

U.S. PATENT DOCUMENTS

| | | | | |
|---|---|---|---|---|
| 2007/0011093 A1* | 1/2007 | Tree | ............... | G06Q 20/02 |
| | | | | 705/40 |
| 2008/0114883 A1* | 5/2008 | Singh | ............... | H04L 67/1008 |
| | | | | 709/228 |
| 2008/0320576 A1* | 12/2008 | Curling | ............... | H04L 63/0815 |
| | | | | 726/8 |
| 2010/0287488 A1* | 11/2010 | Barnett | ............... | A61B 5/0002 |
| | | | | 715/771 |
| 2012/0041939 A1* | 2/2012 | Amsterdamski | ............... | |
| | | | | G06F 17/30867 |
| | | | | 707/709 |
| 2012/0317156 A1* | 12/2012 | Tomita | ............... | G06F 9/544 |
| | | | | 707/812 |
| 2013/0007029 A1* | 1/2013 | Ziemann | ............... | G06F 17/30 |
| | | | | 707/758 |
| 2013/0145048 A1* | 6/2013 | Lee | ............... | H04L 12/2836 |
| | | | | 709/248 |
| 2013/0282417 A1* | 10/2013 | Gaedcke | ............... | G06Q 30/016 |
| | | | | 705/7.13 |
| 2014/0189888 A1* | 7/2014 | Madhok | ............... | H04L 63/0807 |
| | | | | 726/29 |
| 2015/0019547 A1* | 1/2015 | Thalapathy | ............... | G06F 17/30867 |
| | | | | 707/732 |
| 2015/0263981 A1* | 9/2015 | Wang | ............... | H04L 47/70 |
| | | | | 709/220 |
| 2015/0371315 A1* | 12/2015 | Ho | ............... | G06Q 30/0601 |
| | | | | 705/26.8 |
| 2016/0042059 A1* | 2/2016 | Liu | ............... | G06F 3/018 |
| | | | | 707/769 |

\* cited by examiner

1. Please enter a username

2. Please enter a password

Please confirm your password

3. Please provide an email address

3. What type of survey do you want?

○ Customer Feedback
○ Employee Satisfaction
○ Education
○ Market Research
○ Human Resources
○ Non-Profit
○ Political
○ Just for Fun

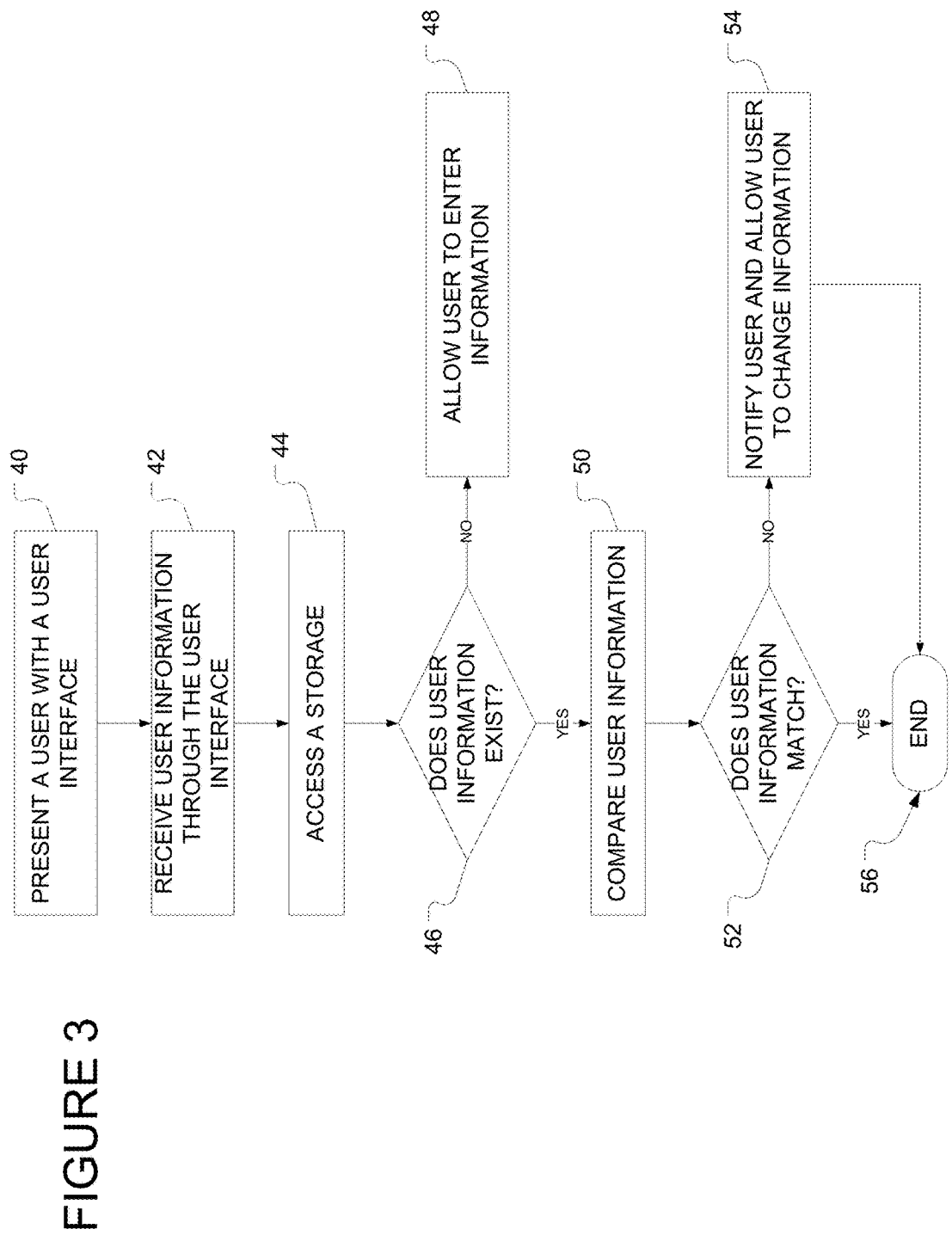

UNIFIED PROFILES

BACKGROUND

Online service providers often request information from the users to allow them to tailor the services or extras offered. Online service providers may include online news services, game sites, survey sites, etc. These requests often take the form of user profiles. The user fills out information that may relate to the services desired, and the user's demographics, including personal information, professional information or both. The provider then uses this information to make suggestions, provide related information to the user, such as through newsletters, advertisements, etc.

Using the example of an online survey provider, for example, the user may employ such a provider to produce surveys for the users' own purposes, such as a customer feedback survey for a salesperson at a car dealership. The user may then end up at the survey provider's site through another link. For example, the user may be sent a customer feedback survey as a customer, rather than a provider. The user accesses the survey to provide feedback. As part of the process the user provides the user's email address or other information. The user information may be different, resulting in two different profiles or partial profiles for the same user in the survey provider's system. This can skew the survey provider's data, clutter the system or cause the survey provider to rely upon outdated in formation.

BRIEF DESCRIPTION OF THE DRAWINGS

FIG. 2 shows an embodiment of a user interface for an online service provider.

FIG. 3 shows an embodiment of a method to update user information in an online service system.

DETAILED DESCRIPTION OF THE EMBODIMENTS

Figure 1:
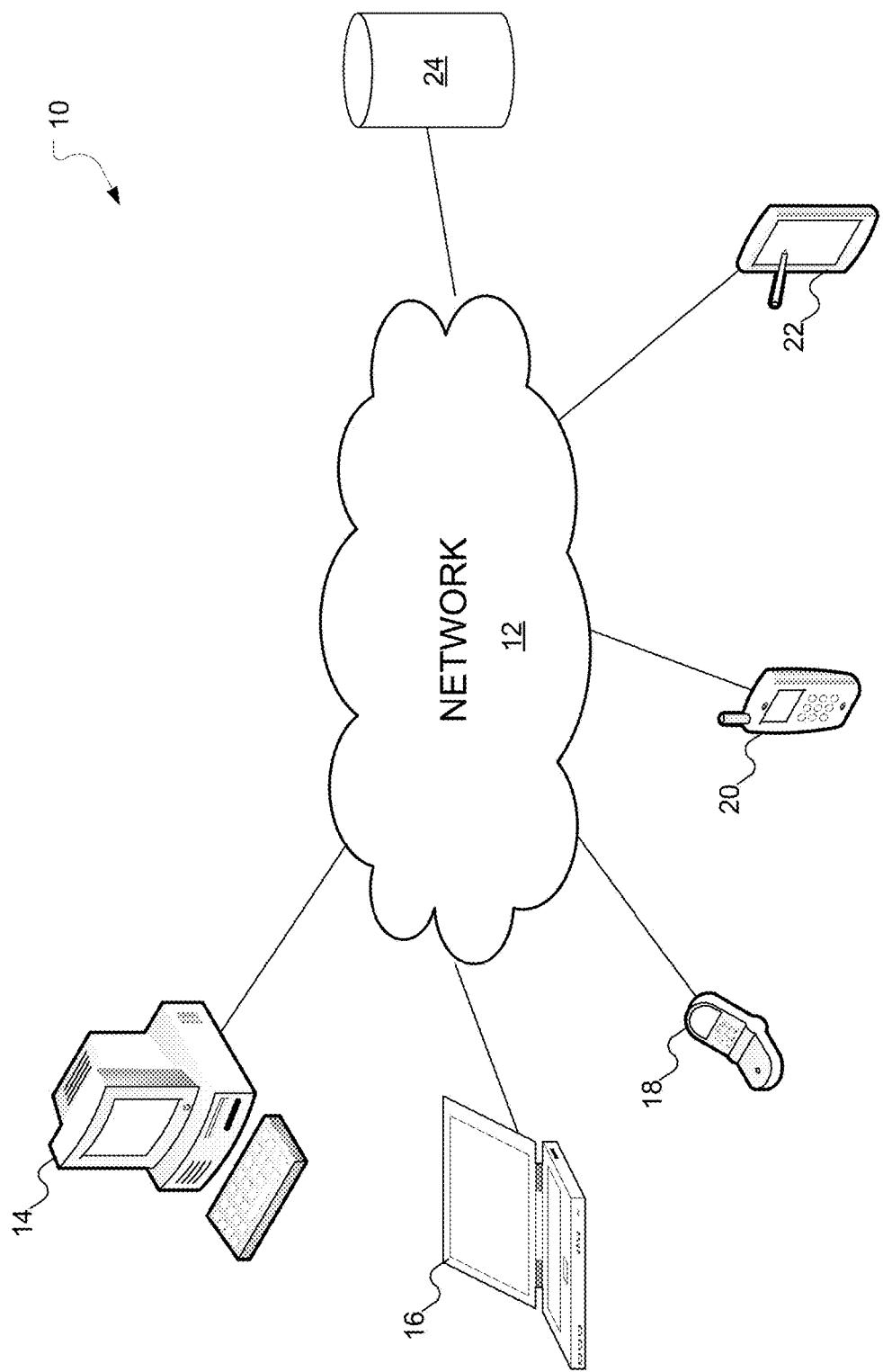
FIG. 1 shows an embodiment of an online service providing system.

FIG. 1 shows an example of a networked system 10. In this example, the system 10 includes a network 12 such as the Internet, an intranet, a home network, a public network, or any other network suitable for implementing embodiments of the disclosed technology. In the embodiment here, personal computers 14 and 16 may connect to the network 12 to communicate with each other or with other devices connected to the network.

The system 100 may also include one or more mobile electronic devices 18-22. Two of the mobile electronic devices 18 and 20 are communications devices such as cellular telephones or smartphones. Another of the mobile devices 22 is a handheld computing device such as a personal digital assistant (PDA), tablet device, or other portable device. A storage device 24 may store some of all of the data that is accessed or otherwise used by any or all of the computers 14 and 16 and mobile electronic devices 18-22. The storage device 24 may be local or remote with regard to any or all of the computers 14 and 16 and mobile electronic devices 18-22.

Users may access a service provider's site for many reasons. In the examples discussed here, the service provider allows users to create and distribute surveys to different types of populations. A user may access the site initially to set up a survey to gauge customer satisfaction as a customer service manager for a first company. At the initial access, the system provides a user interface such as 30 shown in FIG. 2 and prompts the user to provide a username and a password and an email address for the user's account. In some instances, the username may be the person's email address.

In addition to the information specific to the user, the provider may inquire about the type of service wanted. In the survey provider example of this discussion, the system may ask the user to identify the type of survey he or she wants. The survey provider may have a bank or repository of previously set up surveys for any or all of a particular type of survey.

This information provided, beyond the username, password and email address, may be referred to collectively as a user profile. The username, password and the email address may be referred to as user account information. The two collections of information are typically linked together in the system and may have common elements.

The user profile may have much more detailed information beyond just the type of service, including the user's full name, address, organization, position within the organization, demographics of the user, etc. It may also include information about the user's organization, such as what type of organization, such as whether it is a business, school or other educational organization, non-profit, political organization, etc., and further sub-categories within each of those types, and the demographics of the organization, such as size, revenue, customer base, etc.

For example, the current user may identify himself as a customer service manager at ACME Manufacturing, Inc. interested in customer feedback surveys for manufacturing businesses. The system provides the user with a user interface asking these questions and then collects and stores the user information in a storage such as the data store 24 of FIG. 2. The user information, including information from either or both the user profile and the user account information, will be associated with some sort of base identifier connected to the user.

As will be discussed in more detail later, the base identifier is some element of the user's information that is assumed not to change. For example, the user may provide a user name separate from his or her email address that does not change, even if the user's email address does. The base identifier may consist of any identifier for a user that is reasonably persistent, meaning that it has a high likelihood of not changing even if the user changes jobs, locations, etc. Some examples include usernames and email addresses. These are identifier that come from information provided by the user. Other identifiers may be assigned by the system, such as a user number, the user's full name, or even some sort of system identifier. For example, when users log into some systems, the system can recognize a device as having been used by that user before. That system identifier, or a collection of identifiers such as for the user's computer, smartphone and/or tablet, may be associated with the user's profile and account.

If the user then accesses the system later, even if one or more elements of the user's information has changed, the system may still be able to 'recognize' the user. This allows the system to ensure that the user's information remains consistent in the system, which in turn ensures better data collection and data quality.

For example, assume that the customer service manager at ACME Manufacturing moves into human resources and wants to perform an employee satisfaction survey. He logs into his account at the survey service provider and selects an employee satisfaction survey as the desired survey. The service access a data storage and determines that the user's information is in the system, but that he previously wanted customer feedback. This does not match his profile, so the system can ask the user to update his information.

Similarly, the same user moves to a customer service manager job in a different industry and a different location. The information gathered is no longer related to mid-sized manufacturing companies like ACME, located in California, but it is relevant to large auto manufacturers in Michigan. By unifying the user's profile information, it allows the service provider to ensure that the most relevant surveys are provided to the user. When the user logs in, the system may note the user's location from his IP address, and the fact that he is looking for customer feedback surveys for large scale manufacturers would cause the system to request that the user update his information.

In other examples, the user may not have moved, but may be responding to a request from another entity to answer a survey. During the course of that survey, the user may provide information such as a name or email address that the system recognizes, but provides different demographic information than is in the system. The system checks the information provided in the survey against what is in the system and it does not match. The system would then ask the user to clear up the inconsistencies.

FIG. 3 shows a flowchart of an embodiment of a process. Note that this process typically occurs when the user accesses the system for a time other than the initial time, but does allow for an initial access by the user. At 40, the system presents the user with a user interface. The system then receives user information through the user interface at 42. The system then accesses a storage such as the storage shown at 24 in FIG. 1.

If the user information already exists in the storage as determined at 46, the user information is compared to what is in the storage at 50. Note that if the user is a new user, that user would typically be given a different prompt than if the user is just logging in. If, for some reason, the user has an account but the profile is not completed, the user is allowed to enter the information at 48.

If the user information matches at 52, the process ends at 56 and the user accesses the system as normal. If the user information does not match at 52, the system notifies the user that there is a mismatch, and allows the user to reconcile the information. This may take many forms, including just a prompt to update the user information, or specifically pointing out to the user where the information appears inconsistent or out of date. The user then updates his information at 54 and then the process ends at 56.

In this manner, user's profiles are unified to include consistent information for each user. This ensures that the information in the system is accurate and up to date. As some service providers rely upon user profile information to categorize the services requested by the user and then use that information to provide more accurate services to that user, as well as recommendation for other users.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the embodiments here.

What is claimed is:

1. A system, comprising:
a first computer, the first computer including a user interface to allow a user to access an online service provided by an online service provider and to provide user information;
a storage in which to store the user information; and
a processor executing instructions that cause the processor to:
  receive the user information through the user interface and extract a base identifier from the user information received through user interface;
  access the storage to determine if the user information received through the user interface exists in the storage, and to retrieve a base identifier from the user information in the storage when the user information exists in the storage;
  compare the user information, other than the base identifier, in the storage to determine if the user information in storage matches the user information received through the user interface;
  reconciling the user information received through the user interface as a first version of the user information for the user and user information in storage for a same user identified by the base identifier as a second version of user information for the same user; and
  if the user information from the user interface does not match the user information in the storage, notifying the user through the interface.

2. The system of claim 1, wherein the instructions cause the processor to:
  receive updated information from the user; and
  store the updated information in the storage with the base identifier.

3. A computer-controlled method, comprising:
  receiving user information through a user interface, wherein the user information received through the user interface includes a base identifier;
  accessing a storage to determine if the user information including the base identifier exists in the storage;
  comparing the user information, other than the base identifier, in the storage to the user information received through the user interface;
  reconciling the user information in the storage as a first version of the user information and the user information received through the user interface as a second version of user information for a same user identified by the base identifier; and
  notifying the user if the user information does not match.

4. The computer-controlled method of claim 3, further comprising storing the user information when it does not exist in the storage.

5. The computer-controlled method of claim 3, further comprising:
  receiving updated user information through the user interface; and
  storing the updated user information.

6. The computer-controlled method of claim 3, wherein the base identifier comprises at least one of a user name, an email address, a user number, and a system identifier.

* * * * *